March 18, 1947.  J. M. RADABAUGH  2,417,613
ELECTRIC MOTOR CONTROL AND DIFFERENTIAL GEAR DRIVE FOR LAWN MOWERS
Filed Aug. 22, 1944  2 Sheets-Sheet 1
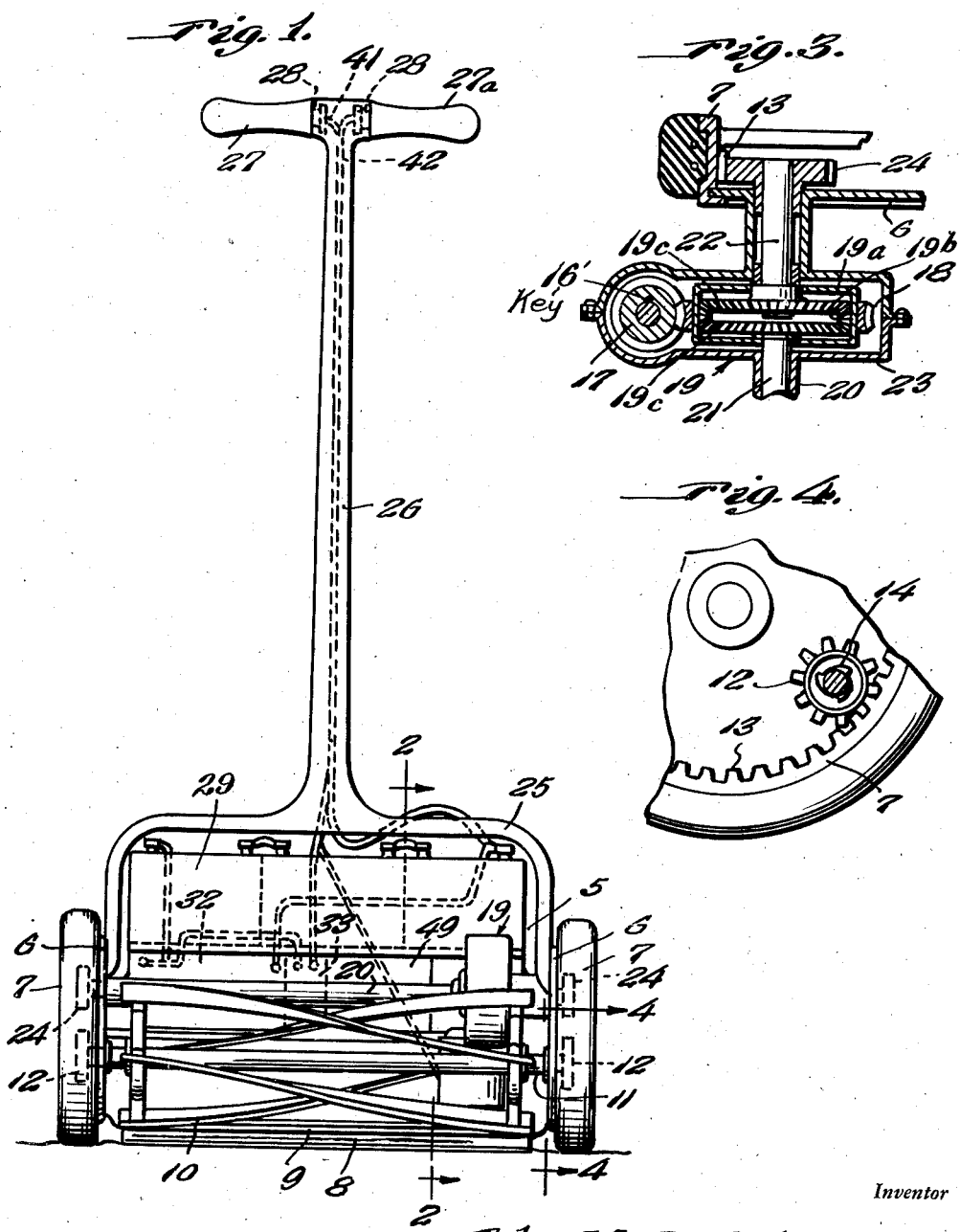
Inventor
John M. Radabaugh
By Clarence A. O'Brien
and Harvey B. Jacobson
Attorneys March 18, 1947.  J. M. RADABAUGH  2,417,613
ELECTRIC MOTOR CONTROL AND DIFFERENTIAL GEAR DRIVE FOR LAWN MOWERS
Filed Aug. 22, 1944  2 Sheets-Sheet 2
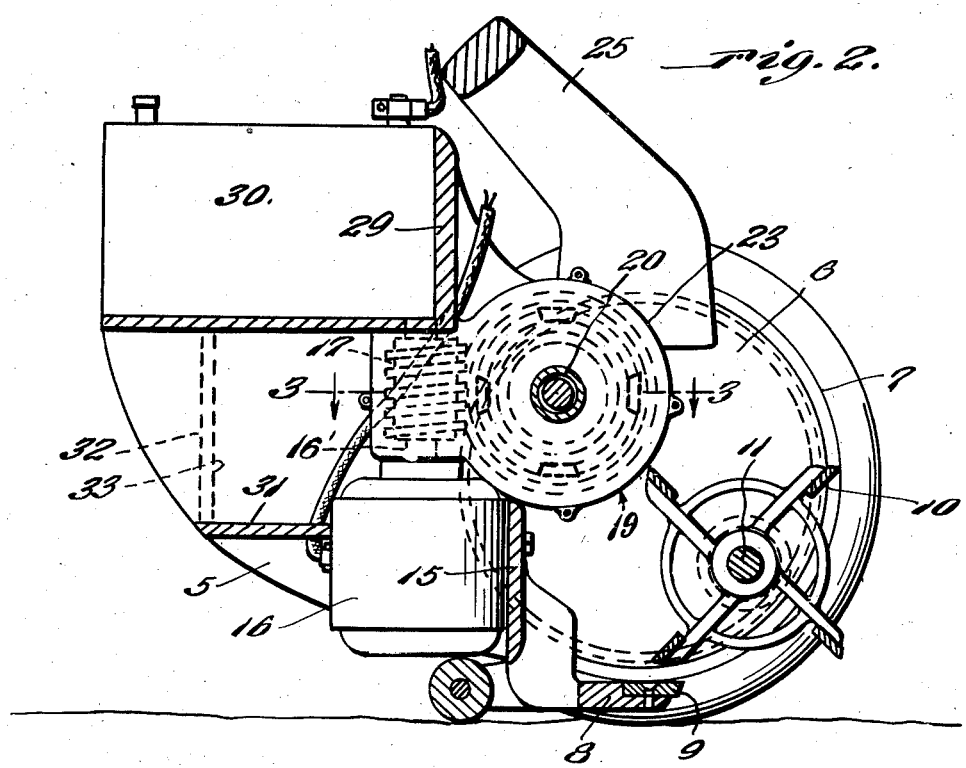
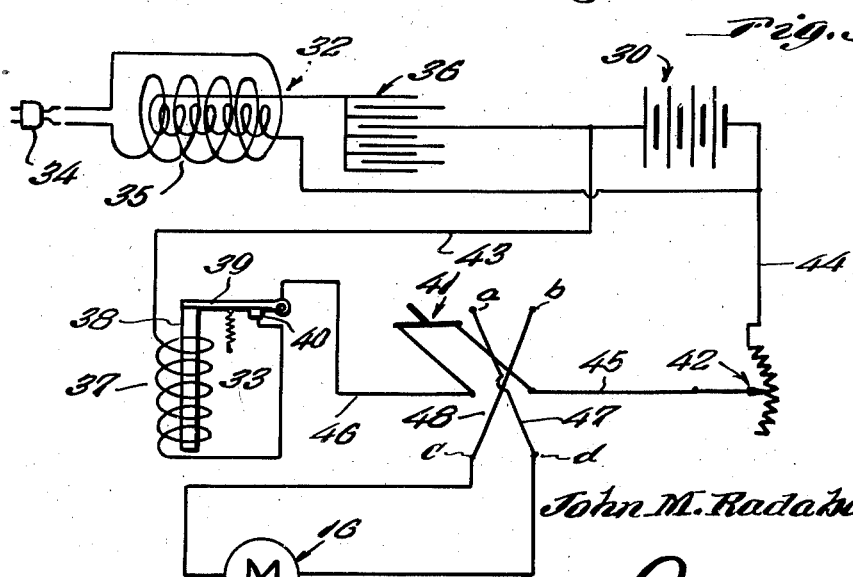
Inventor
John M. Radabaugh
By Clarence A. O'Brien
and Harvey B. Jacobson
Attorneys Patented Mar. 18, 1947

2,417,613

UNITED STATES PATENT OFFICE 2,417,613

ELECTRIC MOTOR CONTROL AND DIFFERENTIAL GEAR DRIVE FOR LAWN MOWERS

John M. Radabaugh, Mount Vernon, Ohio

Application August 22, 1944, Serial No. 550,591

5 Claims. (Cl. 180—19)

This invention relates to lawn mowers, and the primary object of the present invention is to provide a mower of the above kind including traction wheels, a rotary knife reel, a reversible electric motor, and means operatively connecting the motor with the traction wheels so that the lawn mower may be selectively propelled forwardly and rearwardly, there being a ratchet driving mechanism between the traction wheels and the knife reel so that the latter will be driven by the motor upon forward travel of the lawn mower but will be allowed to remain idle when the lawn mower is propelled rearwardly.

A further object of the present invention is to provide a lawn mower characterized as specified above, wherein the driving connection between the motor and the traction wheels includes a differential gearing that allows the traction wheels to travel at different speeds so as to facilitate negotiation of turns in using the mower.

A still further object of the present invention is to provide a lawn mower of the above character having a handle employed solely for steering the lawn mower, as defined from causing travel thereof, said handle having handle bars or grips respectively operable for controlling the direction of travel of the lawn mower by controlling the direction of rotation of the drive shaft of the motor and for controlling the speed of operation of the motor.

Still another object of the present invention is to provide a lawn mower of the above character embodying a frame having means for mounting storage batteries thereon rearwardly of the knife reel and the lower end of the handle, said batteries providing current for operation of the driving motor, the frame also supporting a battery charger and an overload relay or circuit breaker so that the batteries may be conveniently recharged from time to time as found necessary, and so that the motor will be automatically thrown out of operation when overloaded due to clogging of the knife reel or the like.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a front elevational view of a lawn mower constructed in accordance with the present invention.

Figure 2 is an enlarged fragmentary vertical section taken substantially upon the plane of line 2—2 of Figure 1.

Figure 3 is a fragmentary horizontal section taken substantially upon the plane of line 3—3 of Figure 2, with parts omitted.

Figure 4 is a fragmentary vertical section taken on line 4—4 of Figure 1.

Figure 5 is a wiring diagram showing the electrical system embodied in the mower of Figure 1.

Referring in detail to the drawings, the present mower includes a suitable frame 5 embodying spaced rigidly connected side plates or discs 6 at the outer sides of which are journaled coaxial traction wheels 7. Rigidly connecting the discs 6 at the lower portions of the latter is a transverse bar 8 on which is fixed the stationary knife or blade 9 of the lawn mower that cooperates with the knives 10 of a rotary cutting reel in a manner well known in the art. This cutting reel has a driven shaft 11 whose ends are journaled in the discs 6 forwardly of and above the fixed knife 9 and project within the traction wheels 7 where they are provided with pinions 12 meshing with the teeth of internal ring gears 13 carried by the traction wheels 7. A ratchet driving connection is provided at 14, in a well known manner, between the ends of the shaft 11 and the pinions 12, so that when the lawn mower travels forwardly, drive is transmitted from the traction wheels 7 to the cutting reel, but, upon rearward movement of the lawn mower, the cutting reel is allowed to remain stationary or to idle.

Adjacent one side, the frame 5 is provided with a bracket 15 to which is secured an electric motor 16 disposed with its power or armature shaft vertical and projecting upwardly. The projecting end of the power or armature shaft 16' of motor 16 is provided with a worm 17 meshing with the worm ring gear 18 of a differential gearing generally indicated at 19. The differential gearing 19 is of the general type commonly employed in the rear axle assemblies of motor vehicles, and it includes a spider 19a carrying and driven by the ring gear 18, pinions 19b journaled on and rotatable with the spider about the axis of shafts 21 and 22, and beveled gears 19c secured on the adjacent ends of shafts 21 and 22, the pinions 19b being arranged between and meshing with said beveled gears 19c. A transverse axle housing 20 connects the discs 6 and has coaxial shafts 21 and 22 journaled therein and operatively connected at their adjacent inner ends by means of the differential gearing 19. The housing 20 is formed near one end with a casing 23 for the differential gearing 19 and worm 17, and the shafts 21 and 22 respectively project within the traction wheels 7 and have pinions 24 secured on the outer ends thereof and meshing with the ring gears 13 of said traction wheels 7. It will thus be seen that the reversible motor 16 may be driven in either direction so as to drive the traction wheels for causing either forward or rearward travel of the lawn mower. Also, the differential gearing 19 permits each traction wheel 7 to rotate faster than the other for facilitating negotiation of turns during forward and rearward travel of the lawn mower.

Fixed at its ends to the discs 6 is a yoke 25 having an elongated handle 26 rigid with and projecting upwardly and rearwardly from the central portion thereof. The handle 26 is utilized for steering the lawn mower during travel thereof, and it is provided at its upper rear end with handle bars or hand grips 27 and 27a that project laterally in opposite directions and are axially rotatable relative to the handle 26, their axes of rotation being indicated by dotted lines at 28 in Figure 1.

The frame 5 is provided at a point between the discs 6 and directly behind the yoke 25 with a shelf support 29 for a plurality of electric storage batteries 30 that are electrically connected in series with each other. The frame is also provided beneath the support 29 with another shelf support 31 for a portable electric battery charger 32 and an overload circuit breaker or relay 33. The battery charger 32 has a suitable attachment cord equipped at its free end with an ordinary attachment plug 34, as indicated in Figure 5, so that current may be derived from an ordinary house wiring system to utilize the battery charger for charging the batteries 30. As shown, the battery charger includes a transformer 35 adapted to step down the voltage and change the current from alternating to direct so that current of the proper kind and voltage is supplied to the batteries 30 when the latter are being charged. The charger also includes a non-return condenser 36 by means of which the current is allowed to flow from the transformer 35 to the battery but is prevented from returning from the battery or flowing in the reverse direction. This action is due to the different metals used for the respective sets of plates of the condenser.

The relay or circuit breaker 33 includes a coil 37 and a core 38 forming a solenoid in which the core 38 is moved upwardly when attracted. The core 38 is arranged to actuate a pivoted contact 39 normally engaged with a stationary contact 40. Thus, the contacts 39 and 40 are normally engaged to close a circuit, and when the circuit is overloaded, the core 38 moves upwardly and swings the contact 39 out of engagement with contact 40 so as to break the circuit. As shown in Figure 5, the circuit of motor 16 is controlled by a reversing switch 41 mounted in the upper end of handle 26 and operable by the hand grip or bar 27. Also, the supply of current from the batteries 30 to the switch 41 may be regulated by means of a rheostat or manually adjustable resistance 42 that is also mounted in the upper end of handle 26 and operable by the hand grip or bar 27a. One side of the solenoid coil 37 is connected at 43 with one side of batteries 30, while the other side of batteries 30 is connected at 44 to the resistance of rheostat 42. The movable contact of rheostat 42 is connected at 45 with one blade of reversing switch 41, the other blade of switch 41 being connected at 46 with the contact 39 of relay or circuit breaker 33. Contact 40 of circuit breaker or relay 33 is connected to the other side of solenoid coil 37, and the reversing switch 41 has four fixed contacts $a$, $b$, $c$ and $d$. Contact $a$ is connected at 47 with contact $d$ and contact $b$ is connected at 48 with contact $c$. The blades of switch 41 may simultaneously engage contacts $a$ and $b$ or $c$ and $d$, and it will thus be seen that the position of the blades of the switch 41 will govern the direction of rotation of the armature of motor 16. In either position of the switch 41, the contacts 39 and 40 will be included with the solenoid coil 37 in series with the blades of switch 41. Thus, the switch 41 may be thrown from inoperative position to either operative position by turning the hand grip 27 in the proper direction, and the speed of operation of motor 16 may be controlled by turning hand grip 27a in the proper direction. When hand grip 27 is turned in one direction, motor 16 is driven so as to cause forward travel of the lawn mower and to drive the cutting reel. When hand grip 27 is turned in the opposite direction, the motor 16 is reversed so as to cause rearward travel of the lawn mower without driving the cutting reel. The speed of travel in either direction is governed by actuation of rheostat 42 by turning hand grip 27a. Should the motor circuit become overloaded for any reason, such as clogging of the cutting reel, the relay 33 will be actuated to open the motor circuit and prevent damage to the motor or the parts of the lawn mower actuated thereby. It will be noted that a space is provided beside the relay 33, as at 49, for convenient storing of the attachment cord of the battery charger 32 when the latter is not in use. It will also be understood that any suitable means may be provided for detachably connecting the battery charger to the batteries only while the latter are being charged. An obvious advantage of this arrangement is that the lawn mower carries its own source of electricity and the means for replenishing the current of such source from time to time as found necessary, thereby rendering it unnecessary to always have a trailing attachment cord running from the lawn mower to the outlet receptacle of a house wiring system.

From the foregoing description, it is believed that the construction and operation, as well as the advantages of the present invention, will be readily understood and appreciated by those skilled in the art. It will be apparent that the device is comparatively simple in construction, durable, efficient and convenient to use.

While I have illustrated and described a preferred embodiment of the invention, it will be understood that the invention is susceptible to modification and minor changes in details of construction without departing from the spirit and scope of the invention as claimed.

It will be noted that the charger is an active element in the operation of the motor and lawn mower due to the relay associated therewith. Specifically, the charger is interposed between the batteries and the motor so as to coact therewith.

What I claim is:

1. In a hand guided lawn mower having a rotary cutting reel, the combination of a frame having a handle, co-axial traction wheels journaled at opposite sides of the frame and having internal ring gears, aligned axles journaled transversely of the frame and having pinions fixed on their outer ends in mesh with said ring gears, a differential gearing between the inner ends of said axles including a spider-carried ring gear, a reversible rotary electric motor vertically mounted on the frame and having an upwardly projecting armature shaft, a driving connection between the armature shaft of said motor and the ring gear of said differential gearing, and a manually operable reversing switch for said motor carried by the hande.

2. In a hand guided lawn mower having a rotary cutting reel, the combination of a frame, co-axial traction wheels journaled at opposite sides of the frame and having internal ring gears, aligned axles journaled transversely of the frame and having pinions fixed on their outer ends in mesh with said ring gears, a differential gearing between the inner ends of said axles including a spider-carried ring gear, a reversible rotary electric motor vertically mounted on the frame and having an upwardly projecting armature shaft, a driving connection between the armature shaft of said motor and the ring gear of said differential gearing, a manually operable reversing switch for said motor, a handle fixed to the frame for steering the mower, and hand grips carried by and projecting from opposite sides of said handle, one of said hand grips being axially rotatable and operatively connected to said reversing switch.

3. In a hand guided lawn mower having a rotary cutting reel, the combination of a frame, coaxial traction wheels journaled at opposite sides of the frame and having internal ring gears, aligned axles journaled transversely of the frame and having pinions fixed on their outer ends in mesh with said ring gears, a differential gearing between the inner ends of said axles including a spider-carried ring gear, a reversible rotary electric motor vertically mounted on the frame and having an upwardly projecting armature shaft, a driving connection between the armature shaft of said motor and the ring gear of said differential gearing, a manually operable reversing switch for said motor, a handle fixed to the frame for steering the mower, hand grips carried by and projecting from opposite sides of said handle, one of said hand grips being axially rotatable and operatively connected to said reversing switch, and a rheostat for controlling the speed of said motor, the other hand grip also being axially rotatable and operatively connected to said rheostat.

4. The construction defined in claim 1, in combination with a rearwardly facing shelf on the frame rearwardly of said axles and above the motor, electric storage batteries supported on said shelf and electrically connected to the motor through said reversing switch.

5. The construction defined in claim 1, in combination with rearwardly facing superimposed shelves on the frame, electric storage batteries supported on the uppermost one of said shelves, a charger for said batteries supported by the other shelf beneath the batteries, said storage batteries being electrically connected to the motor through said reversing switch.

JOHN M. RADABAUGH.

REFERENCES CITED

The following references are of record in the file of this patent:

UNITED STATES PATENTS

| Number | Name | Date |
| --- | --- | --- |
| 753,284 | Maxim | Mar. 1, 1904 |
| 1,115,350 | Vincent | Oct. 27, 1914 |
| 2,185,659 | Chernow | Jan. 2, 1940 |
| 2,298,135 | Klein | Oct. 6, 1942 |
| 2,300,461 | O'Dell et al. | Nov. 3, 1942 |